Sept. 19, 1967          J. W. LANG          3,342,493

MATHEMATICS GAME BOARD

Filed Feb. 13, 1964

INVENTOR
JAMES W. LANG
BY Meyers & Peterson
ATTORNEYS

United States Patent Office 3,342,493
Patented Sept. 19, 1967

3,342,493
MATHEMATICS GAME BOARD
James W. Lang, P.O. Box 224, Mound, Minn. 55364
Filed Feb. 13, 1964, Ser. No. 344,629
1 Claim. (Cl. 273—135)

ABSTRACT OF THE DISCLOSURE

A mechanical game board apparatus comprising a game board having horizontal and vertical lines defining a playing area with a plurality of horizontally disposed rows and vertically disposed columns of squares with an outer edge surface arranged therearound. The outer edge surface is provided with numerical indicia, and the squares at the intersection of a projection extending inwardly from each row and from each column represent certain predetermined resultant quantities. The board is divided into two opposing fields along a diagonal extending between oppositely disposed corners thereof, the individual squares disposed along the diagonal line being common to each field of play. A plurality of tokens are provided, each token having indicia thereon representing one of said resultant quantities.

---

The present invention relates generally to an educational mathemtaical game, and more particularly to a mathematical game having a plurality of individual rows and columns of squares, with indicia disposed outwardly and adjacent to said squares, and more particularly to an educational mathematical game utilizing tokens to be received in certain of said squares, the tokens carrying indicia representative of the arithmetical or mathematical function represented by the combined factors of the row indicia and the column indicia.

It is the purpose of the present invention to develop arithmetic skill through a game which combines both arithmetic skill and chance. The apparatus of the present invention may be utilized for improving or developing skills in either multiplication or addition, and also for thinking in terms of inverse functions as well as being representative of various numerical systems. The game board provides an ideal device for teaching these concepts to students, this being accomplished by the placement of a number or tally in a square which is associated with a pair of numerals.

The game board area is divided into two fields or zones, the division being along a diagonal drawn between two oppositely disposed corner squares. The field on one side of the diagonal is the area available for one contestant, the area on the other side of the diagonal being for the use of the other contestant, the individual squares arranged along the diagonal being for each of the two contestants jointly. The outer squares in the individual rows and columns are provided with numbers as in a multiplication table or as in an addition table. Each of the inner squares of the respective rows and columns is accordingly associated with a pair of numbers in the outer squares. From multiplication, the numbers in the outer squares represent the individual factors of respective products, and the inner squares are accordingly adapted to receive numbered tallies which represent the products of the numerical indicia at the outer edge of the respective rows and columns. For addition, the numbers in the outer squares represent addends of sums and the inner squares of the respective rows and columns are places to receive numbered tallies which represent the respective sums.

The arrangement of the board and tallies is preferably such that a sufficient number of tallies are provided for taking care of all of the squares in the individual rows and columns of one playing area, and including those squares forming the diagonal area between the respective playing areas. In this connection, a ten by ten numbered board would be provided with fifty-five tallies. In any game where there is an uneven quantity of numbered tallies, an extra tally may be included which is playable in either of the individual playing areas.

In order to utilize the individual tallies, a contestant will randomly select a tally and place it in the appropriate square which is representative of the numerical value of the associated row and column indicia, and which lies in his playing area. An object of the play of the game is for each player to correctly place the tallies in the apropriate playing area and to ultimately arrange completed rows, columns, or diagonals confined to his playing area and in which a common square from the diagonal area is a member. A "completed" row extends from the diagonal area to an edge square along the board. For specific scores, a player scores a point for each tally the opponent has placed in the wrong position. Also, if a player has arranged his tallies in completed rows, columns, or diagonals in which a common square is a member, points are scored for each tally arranged therein. The individual players may check the accuracy of their play with a multiplication table or an addition table being used as a key. The player having the greatest number of points shall be declared the winner.

Therefore, it is an object of the present invention to provide a game board apparatus which may be utilized for developing arithmetic skills.

It is a further object of the present invention to develop skills in either multiplication or addition, and for thinking in terms of various numerical systems.

It is yet a further object of the present invention to provide a game board which is divided into rows and columns, the outer squares of the individual rows and columns being provided with numerical indicia, the inner squares being associated with a pair of numbers arranged in these outer squares, such as in a multiplication table or in an addition table, individual numbered tallies being provided for placing in the individual squares of the rows and columns.

Other and further objects of the present invention will become apparent to those skilled in the art upon a study of the following specification, appended claims, and accompanying drawings wherein:

Figure 1:
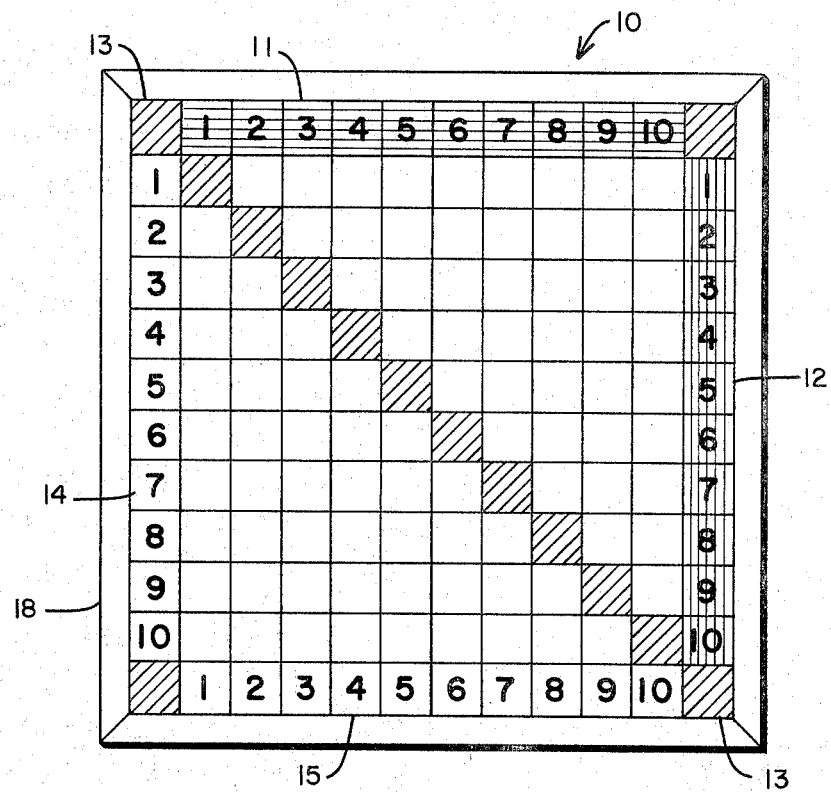
FIGURE 1 is a top plan view of a game board apparatus fabricated in accordance with the present invention.

In accordance with the preferred modification of the present invention, attention is directed to FIGURE 1 wherein there is illustrated a game board apparatus generally designated 10 which includes a group of rows and columns, the outer margin of each of the individual rows and columns being provided with numerical indicia corresponding to a numbering system. The numerals arranged along the outer margin may be consecutively positioned, as indicated. The marginal portions of two adjacent sides, such as, for example, the sides 11 and 12 have their numbers keyed together, such as by having both of them printed in a single color or of a specific numerical configuration so as to denote the fact that a diagonal portion or half of the board as indicated by the squares disposed along a diagonal line such as the squares 13—13 constitute a playing field for one of the players. Accordingly, the similar contiguous marginal areas 14 and 15 have their numbers keyed together in the same manner, the numbers along the sides 14 and 15 being distinguishable from the numbers along the rows 11 and 12 by being of a different color, font, or type.

Figure 2:
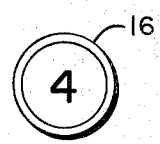
FIGURE 2 is a top plan view of a numbered tally drawn to a slightly enlarged scale, the tally being adapted to be placed in an appropriate square of the game board illustrated in FIGURE 1.

The playing field of the first player is indicated by the area above and to the right of the diagonal area 13—13, that of the other player being below and to the left of this diagonal. The individual squares in the diagonal line are appropriately within the playing field of each player jointly. The tallies such as the tally 16 of FIGURE 2 are imprinted with numerals on either one or both sides thereof. These tallies are arranged to be received in the squares defined by the indicia appearing on the individual rows and columns. If desired, an identical numeral may be imprinted on each side of the tally, the numeral at one side being keyed to the color or configuration of one player, and on the other side, to that of the other player. The numeral 4, for example, in a multiplication game, may be placed in the row and column defined by the numerals "1" and "4" respectively. If the player so desires, he may place the tally in the area defined by the row and column designations "2" and "2" respectively. It will be appreciated that in addition to the multiplication system where the individual rows and columns represent factors, the game board may be utilized for an addition game, as well. During the play of the game, the tallies are either placed randomly into one or more piles, or they are racked in random fashion, each player in turn taking a tally of his choice for ultimate placement in his individual playing area. Since the tallies are provided with indicia on both sides, the player using the particular specific area will place the tallies on the board with the appropriate numeral of the tally exposed to view.

During the play of the game, after the player has selected a specific square for his tally, he cannot subsequently put the tally in another location. If the tally is placed in the wrong square, another tally may be subsequently placed on top of it in a later play.

In order to score the game, the player scores for correctly placing tallies in his playing area and also scores in accordance with his ability to secure completed rows, columns, or diagonals in which a common square is a member. The player having the greatest number of points in accordance with this objective is declared the winner. If desired, and as a penalty for inaccuracy of effort, a player may score additional points for each tally his opponent has placed in the wrong spaces. Furthermore, if a player has complete rows, columns, or diagonals in which a common square is a member, he may count each tally arranged in this row, column, or diagonal as a point. Generally, no tally should be counted more than once.

If desired, the game may be played until all of the tallies have been placed within the individual fields. As an alternative, the game could be terminated when one of the players has completed one or more completed lines either vertically, horizontally, or diagonally from the game board diagonal 13—13 to an outer margin. Obviously, other alternatives are available in the use of the game board apparatus.

The arrangement of the board and tallies is such that a number of tallies are provided which are necessary to take care of all of the places in either of the two playing fields. In this connection, a ten by ten numbered board requires fifty-five tallies with numerical indicia thereon. In order to provide each player in this game with an equal number of tallies, an extra tally having no indicia thereon, playable in any place, will normally be included.

The game board may be fabricated from wood, metal, pressed fibers, or the like. Preferably, a border or edge frame 18 is provided along the outer periphery of the board, this being provided in accordance with the mechanical or esthetic requirements of the individual playing board element.

Figure 3:
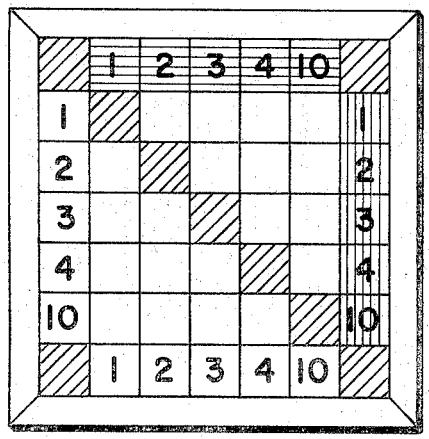
FIGURE 3 is a top plan view of a game board apparatus prepared in accordance with the present invention, and utilizing a numerical system to the base five.
Figure 4:
FIGURE 4 is a top plan view of a numbered tally drawn to a slightly enlarged scale, the tally being adapted for use in connection with the game board apparatus shown in FIGURE 3.

Particular attention is now directed to FIGURES 3 and 4 of the drawings wherein there is shown, respectively, the game board generally designated 20 and the appropriate tally for use in connection therewith designated 21. The board 20 is drawn to a numerical system to the base five, the objects and play of the game being the same as that discussed hereinabove in connection with FIGURES 1 and 2. The only significant difference lies in the selection of the appropriate square for the tally. The tally shown in FIGURE 4, for example, indicates the numeral 13 to the base 5, this value being equivalent to the number 8 in the decimal system, and having its appropriate location determined by such a number equivalent.

It will be appreciated that various other modifications of the game board apparatus of the present invention may be designed which depart from the specific embodiments shown herein, but which are still within the spirit and scope of the present invention. Accordingly, there is no intention of limiting the scope of the present invention to these specific examples alone.

What is claimed is:

A mathematical game board apparatus comprising game board means having horizontally and vertically disposed lines defining a playing area with a plurality of horizontally and vertically disposed squares with an outer edge periphery arranged therearound, a diagonal line between oppositely disposed corners of said game board means dividing the board into two opposing playing fields on either side thereof with the squares disposed along said diagonal line being common to each playing field, a plurality of tokens adapted to be disposed within the area defined by each of said squares, indicia means arranged adjacent said rows and said columns and being disposed outwardly from said outer edge periphery with each indicia representing a certain mathematical factor, the square at the intersection of a projection extending inwardly from each row and from each column being adapted to represent a certain predetermined resultant quantity in which each mathematical factor is an input function, said plurality of tokens consisting of an even number of tokens, one token having no indicia thereon and playable in any of said squares, the remaining tokens having indicia thereon representing individual of said certain resultant quantities and totalling the number of squares included in one of said playing fields and said common squares, said remaining tokens carrying indicia such that all of said remaining tokens are playable in either one of said playing fields, including said common squares, so as to completely fill the same.

References Cited

UNITED STATES PATENTS

| | | | |
|---|---|---|---|
| 2,320,832 | 6/1943 | Schoenberg et al. | 273—130 |
| 2,766,987 | 10/1956 | Seelbrede et al. | 273—135 |
| 2,769,640 | 11/1956 | Elder | 273—135 |
| 2,871,581 | 2/1959 | Guzak | 273—135 X |
| 3,064,979 | 11/1962 | Ralston | 273—135 |
| 3,179,415 | 4/1965 | Lukens | 273—135 |

DELBERT B. LOWE, *Primary Examiner.*